(12) United States Patent
Sugimura et al.

(10) Patent No.: US 8,613,809 B2
(45) Date of Patent: *Dec. 24, 2013

(54) HIGH CLEANLINESS SPRING STEEL AND HIGH CLEANLINESS SPRING EXCELLENT IN FATIGUE PROPERTIES

(75) Inventors: Tomoko Sugimura, Kobe (JP); Sei Kimura, Kakogawa (JP); Koichi Sakamoto, Kobe (JP); Atsuhiko Yoshida, Kobe (JP); Takeshi Inoue, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 632 days.

This patent is subject to a terminal disclaimer.

(21) Appl. No.: 12/301,544

(22) PCT Filed: May 23, 2007

(86) PCT No.: PCT/JP2007/060538
§ 371 (c)(1),
(2), (4) Date: Nov. 19, 2008

(87) PCT Pub. No.: WO2007/142034
PCT Pub. Date: Dec. 13, 2007

(65) Prior Publication Data
US 2009/0194204 A1    Aug. 6, 2009

(30) Foreign Application Priority Data

Jun. 9, 2006 (JP) .................. 2006-160796
Jun. 9, 2006 (JP) .................. 2006-161240

(51) Int. Cl.
*C22C 38/00*    (2006.01)
*C22C 38/02*    (2006.01)
*C22C 38/04*    (2006.01)
*C22C 38/06*    (2006.01)

(52) U.S. Cl.
USPC ........... 148/331; 148/320; 148/335; 148/333; 148/336

(58) Field of Classification Search
USPC .................. 148/331, 320, 335, 333, 336
See application file for complete search history.

(56) References Cited

U.S. PATENT DOCUMENTS 5,904,787 A    5/1999    Matsumoto et al.
6,328,820 B1   12/2001   Yamamoto et al.
(Continued)

FOREIGN PATENT DOCUMENTS

EP    0 462 779 A2    12/1991
EP    0 614 994 A1    9/1994
(Continued)

OTHER PUBLICATIONS

Machine translation of JP 2003073776.*
(Continued)

*Primary Examiner* — Rebecca Lee
(74) *Attorney, Agent, or Firm* — Oblon, Spivak, McClelland, Maier & Neustadt, L.L.P.

(57) ABSTRACT

High cleanliness spring steel useful in manufacturing a spring with $SiO_2$-based inclusions being extremely controlled and excellent in fatigue properties is provided.
High cleanliness spring steel which is steel containing;
C: 1.2% (means mass %, hereafter the same with respect to the component) or below (not inclusive of 0%),
Si: 1.2-4%,
Mn: 0.1-2.0%,
Al: 0.01% or below (not inclusive of 0%),
and the balance comprising iron with inevitable impurities, wherein;
the total of oxide-based inclusions of 4 or above of L (the large diameter of an inclusion)/D (the short diameter of an inclusion) and 25 μm or above of D and oxide-based inclusions of less than 4 L/D and 25 μm or above of L, in the oxide-based inclusions of 25 mass % or above of oxygen concentration and 70% (means mass %, hereafter the same with respect to inclusions) or above of $SiO_2$ content when $Al_2O_3+MgO+CaO+SiO_2+MnO=100\%$ is presumed, out of inclusions in the steel, is 20 nos./500 g or below.

10 Claims, 4 Drawing Sheets

(56) References Cited

U.S. PATENT DOCUMENTS

| | | |
|---|---|---|
| 6,338,763 B1 | 1/2002 | Hashimura et al. |
| 2006/0108027 A1 | 5/2006 | Sugimura et al. |

FOREIGN PATENT DOCUMENTS

| | | |
|---|---|---|
| EP | 1 612 287 A1 | 1/2006 |
| EP | 1 619 264 A1 | 1/2006 |
| GB | 2 410 252 A | 7/2005 |
| JP | 58073718 A * | 5/1983 |
| JP | 61-136612 | 6/1986 |
| JP | 62 099436 | 5/1987 |
| JP | 62 099437 | 8/1987 |
| JP | 63 140068 | 6/1988 |
| JP | 4-6211 | 1/1992 |
| JP | 05 320827 | 12/1993 |
| JP | 6-158226 | 6/1994 |
| JP | 9-310145 | 12/1997 |
| JP | 11-199982 | 7/1999 |
| JP | 11 302784 | 11/1999 |
| JP | 2000 169937 | 6/2000 |
| JP | 2000 178686 | 6/2000 |
| JP | 2001-181788 | 7/2001 |
| JP | 2003 73776 | 3/2003 |
| JP | 2003-268437 | 9/2003 |
| JP | 2003 293074 | 10/2003 |
| JP | 2003-342688 | 12/2003 |
| JP | 2004-346402 | 12/2004 |
| JP | 2005-29887 | 2/2005 |
| JP | 2006-144105 | 6/2006 |
| KR | 10-2006-0058031 | 5/2006 |
| WO | WO 2005/071120 A1 | 8/2005 |

OTHER PUBLICATIONS

Machine translation of JP 11302784.*

Mimura, T. et al., "Control of Inclusions in Tire Cord Steel and Valve Spring Steel", Nishiyama Memorial Technical Lecture, pp. 131-133, (2004).

U.S. Appl. No. 12/597,919, filed Oct. 28, 2009, Sugimura, et al.

Office Action issued Nov. 12, 2010, in Korean Patent Application No. 10-2008-7029877 (with English translation).

Supplementary European Search Report issued Mar. 21, 2011 in European Patent Application No. EP20070743972 filed May 23, 2007.

Office Action issued Apr. 11, 2011, in Korean Patent Application No. KR20117000857, filed May 23, 2007.

European Search Report issued Dec. 13, 2011 in EP 20110008110, filed May 23, 2007.

* cited by examiner

HIGH CLEANLINESS SPRING STEEL AND HIGH CLEANLINESS SPRING EXCELLENT IN FATIGUE PROPERTIES

TECHNICAL FIELD

The present invention relates to high cleanliness spring steel excellent in fatigue properties and a high cleanliness spring excellent in fatigue properties, and relates to high cleanliness spring steel wherein hard metallic inclusions with extremely low ductility are reduced and fatigue properties are improved, and a high cleanliness spring excellent in fatigue properties obtained using the steel. The spring obtained from this high cleanliness spring steel is useful as a valve spring and a clutch spring for an automobile engine, and a brake spring wherein extremely high fatigue properties are required.

BACKGROUND ART

In recent years, in the field of automobiles for example, as weight reduction and output enhancement are more highly required, a high stress design is directed also in a valve spring and a suspension spring used for an engine, a suspension and the like, and a clutch spring and the like. Therefore, for these springs, ones which are excellent in fatigue resistance property and setting resistance property are strongly required to cope with increase in load stress. In particular, with respect to a valve spring, the requirement for increasing fatigue strength is very strong, and even SWOSC-V (JIS G 3566), which is said to be high in fatigue strength among conventional steel, is hard to cope with.

In spring steel material wherein high fatigue strength is required, it is necessary to reduce hard nonmetallic inclusions present in the steel as much as possible. From such a viewpoint, with respect to the steel used for the usage described above, it is common that high cleanliness steel wherein presence of nonmetallic inclusions described above is decreased as much as possible is used. Because the risk of wire breakage and fatigue breakage due to nonmetallic inclusions increases as high strengthening of material progresses, the requirement for reduction and miniaturization of the nonmetallic inclusions described above which becomes its main cause has become greatly severe.

From the viewpoint of realizing reduction and miniaturization of hard nonmetallic inclusions in steel, a variety of technologies have been proposed so far. For example in the Patent Document 1, it is disclosed that, in valve spring steel, if controlled to $CaO$—$Al_2O_3$—$SiO_2$ three-component based inclusions whose melting point is lower than approximately 1,400-1,500 DEG C., they do not become the start point of fatigue failure and fatigue properties improve.

Also, in the Patent Document 1, high cleanliness steel, whose cold workability and fatigue property are improved by stipulating the average composition of nonmetallic inclusions so that the nonmetallic inclusions are well stretched in hot rolling and are crushed and finely dispersed in a cold rolling or wire drawing process, is realized. Further, in the Patent Document 2 also, the composition of nonmetallic inclusions which are easily stretched and refined in hot rolling, cold rolling and drawing is stipulated.

On the other hand, in the Patent Document 3, a technology is disclosed wherein the melting point of an oxide-based inclusion is stipulated as 1,500 DEG C. or below to make it an inclusion having a low-melting composition easily stretched in hot and cold rolling.

Further, in the Patent Document 4, as an inclusion having a low-melting composition easily stretched in hot rolling and cold rolling, $Al_2O_3$—$SiO_2$—$MnO$ based one containing MgO and/or CaO is stipulated.

Non-patent Document 1: "$182^{nd}$ and $183^{rd}$ Nishiyama Memorial Technical Lecture", edited by The Iron and Steel Institute of Japan, P. 131-134. Patent Document 1: Japanese Unexamined Patent Application Publication No. S62-99436
Patent Document 2: Japanese Unexamined Patent Application Publication No. S62-99437
Patent Document 3: Japanese Unexamined Patent Application Publication No. H5-320827
Patent Document 4: Japanese Unexamined Patent Application Publication No. S63-140068

DISCLOSURE OF THE INVENTION

Problems to be Solved by the Invention

In a variety of conventional technologies proposed until now, it was common to realize excellent fatigue strength by controlling the average composition of inclusions. In the meantime, in recent years, following properties (I) and (II) are required for a valve spring.
(I) Because there is a tendency of securing the space below a bonnet to ensure collision safety for pedestrian protection, reduction of engine height, that is, reduction of spring height, is required.
(II) For improving fuel economy, weight reduction of a spring is required.

As described above, although further high strengthening of spring steel is required for realizing reduction of spring height and reduction of weight, it is not possible to cope with the requirement of further high strengthening merely by conventional technologies. Its reason is that there is a problem that control of inclusions of very high level has been already performed so far, inclusions inducing breakage exist very rarely only, and it is difficult to reduce further. Also, it has been known that hard crystal-based inclusions would be harmful, however, there has been no knowledge on distinction of particularly harmful one and not among hard crystal-based inclusions.

Further, in a variety of conventional technologies proposed until now, main point is to control the inclusion composition to a low melting point region and to aim to effect refining, however, if the composition region is one which includes $SiO_2$, $SiO_2$ may theoretically be generated by phase separation. Particularly, because valve spring steel is heated before rolling after forging, occurring of generation of $SiO_2$ by phase separation becomes highly probable at this time. $SiO_2$ thus generated is hard, is hardly deformed in rolling, and easily remains in the final product. $SiO_2$ remaining in the final product may become the cause of breakage in a wire rod even it is in extremely small numbers, and realization of high cleanliness steel capable of coping with requirement in recent years for further enhancement of cleanliness may not become possible.

The present invention has been developed under such circumstances, and its purpose is to provide spring steel useful in obtaining a spring excellent in fatigue properties and a spring excellent in fatigue properties.

Means to Solve the Problems

The purpose of the present invention described above can be achieved by following high cleanliness spring steel in relation with the present invention. That means, a first high cleanliness spring steel in relation with the present invention is:
steel containing;
C: 1.2% (means mass %, hereafter the same with respect to the component) or below (not inclusive of 0%),
Si: 1.2-4%,
Mn: 0.1-2.0%,
Al: 0.01% or below (not inclusive of 0%),
and the balance comprising iron with inevitable impurities, wherein;
total of oxide-based inclusions of 4 or above of L (the large diameter of an inclusion)/D (the short diameter of an inclusion) and 25 μm or above of D and oxide-based inclusions of less than 4 L/D and 25 μm or above of L, in the oxide-based inclusions of 25 mass % or above of oxygen concentration and 70% (means mass %, hereafter the same with respect to inclusions) or above of $SiO_2$ content when $Al_2O_3+MgO+CaO+SiO_2+MnO=100\%$ is presumed, out of inclusions in the steel, is 20 nos./500 g or below.

The first high cleanliness spring steel described above may further contain, as other elements:
(a) one or more kinds selected from a group consist of;
Cr: 3% or below (not inclusive of 0%),
Mo: 0.5% or below (not inclusive of 0%),
W: 0.5% or below (not inclusive of 0%), and
Co: 0.5% or below (not inclusive of 0%),
(b) one or more kinds selected from a group consist of;
V: 0.5% or below (not inclusive of 0%),
Nb: 0.1% or below (not inclusive of 0%), and
Ti: 0.1% or below (not inclusive of 0%),
(c) Cu: 0.1% or below (not inclusive of 0%) and/or Ni: 0.5% or below (not inclusive of 0%),
(d) REM by 0.1-50 ppm,
(e) total of alkali metal elements and/or alkaline earth metal elements by 0.1-50 ppm.

Further, a second high cleanliness spring steel in relation with the present invention is characterized that: oxide-based inclusions with a width of 3 μm or above which are present in the surface layer side from the surface of a wire rod to the depth of ¼ of the diameter satisfy inequality (1) below, further, the concentration of MgO: 5 mass % or below (inclusive of 0 mass %) and the concentration of MnO: 10 mass % or below (inclusive of 0 mass %), also, when each concentration [Cn], [An] and [Sn] of CaO, $Al_2O_3$ and $SiO_2$ in the oxide-based inclusions are expressed respectively as per the equations (2)-(4) below, they satisfy the relation of the equations (5) and (6) below, and when these CaO concentration [Cn], $Al_2O_3$ concentration [An] and $SiO_2$ concentration [Sn] are expressed by a CaO—$Al_2O_3$ $SiO_2$ three component system phase diagram, the melting point of the oxide-based inclusions is 1,500 DEG C. or below. Here, "width of inclusion" means the diameter of an inclusion in the direction perpendicular to the axial direction when observed by a section including the axis line of the wire rod.

$$CaO+Al_2O_3+SiO_2>80 \text{(mass \%)} \quad (1)$$

$$[Cn](\text{mass \%})=[(CaO)/(CaO+Al_2O_3+SiO_2)]\times100 \quad (2)$$

$$[An](\text{mass \%})=[(Al_2O_3)/(CaO+Al_2O_3+SiO_2)]\times100 \quad (3)$$

$$[Sn](\text{mass \%})=[(SiO_2)/(CaO+Al_2O_3+SiO_2)]\times100 \quad (4)$$

$$[An]+4.29[Sn]\leq221.9(\text{mass \%}) \quad (5)$$

$$[An]\leq30(\text{mass \%}) \quad (6)$$

Also, in the spring steel described above, MgO concentration and MnO concentration, as well as CaO, $Al_2O_3$, $SiO_2$ in the inequality (1) represent mass % against total inclusion particles.

Although the chemical componental composition of the second high cleanliness spring steel described above is not particularly limited as far as it is suitable composition for spring steel, as a preferable one, steel material respectively containing C, 1.2 mass % or below (not inclusive of 0%), Si: 1.2-4 mass %, Mn: 0.1-2.0 mass %, Al: 0.01 mass % or below (not inclusive of 0%) can be exemplarily cited. Also, this high cleanliness spring steel may further contain one or more kinds selected from a group consist of Cr, Ni, V, Nb, Mo, W, Cu, Ti, Li, Na, K and rare earth elements. Preferable contents in containing them are, Cr: 0.5-3 mass %, Ni: 0.5 mass % or below, V: 0.5 mass % or below, Nb: 0.1 mass % or below, Mo: 0.5 mass % or below, W: 0.5 mass % or below, Cu: 0.1 mass % or below, Ti: 0.1 mass % or below, Li: 0.0005 mass % or below, Na: 0.0010 mass % or below, K: 0.0010 mass % or below, and rare earth elements: 0.0010 mass % or below. Also, the concentration of these components represents the concentration in the steel.

Furthermore, the present invention also includes high cleanliness springs excellent in fatigue properties obtained using the first spring steel and the second spring steel described above.

Effects of the Invention

In accordance with the first high cleanliness spring steel in relation with the present invention, realization of high strengthening is possible by performing severe drawing work because $SiO_2$-based inclusions are extremely controlled, and high cleanliness spring steel capable of manufacturing springs excellent in fatigue properties easily and springs excellent in fatigue properties obtained using the steel can be realized.

Also, in accordance with the second high cleanliness spring steel in relation with the present invention, high cleanliness spring steel that obtains springs excellent in fatigue properties can be realized by making entire inclusions with low melting point and easy to be deformed, and hard to generate $SiO_2$ even if phase separation occurs in heating before hot rolling and during hot rolling.

DESCRIPTION OF THE REFERENCE NUMERALS

1. Beaker
2. Aqueous solution of nitric acid
3. Sample

4. Heater
5. Membrane filter
6. Filter stand
7. Funnel
8. Flask

BEST MODE FOR CARRYING OUT THE INVENTION

[The First Embodiment]

The present inventors made investigations from a variety of angles to obtain spring steel suitable to manufacturing of springs that exert excellent fatigue properties. As a result, it was found out that, among hard crystal-based inclusions (to be exact, oxide-based inclusions with 25 mass % or above oxygen concentration), $SiO_2$-based inclusions in particular were harmful. More specifically, it was found out that, because the composite inclusions which were inclusions of $SiO_2$ or of high $SiO_2$ percentage and were inclusions of 4 or above of L (the large diameter of an inclusion)/D (the short diameter of an inclusion) and 25 μm or above of D or inclusions of less than 4 of L/D and 25 μm or above of L extremely lowered fatigue properties even though the density was extremely low, it was necessary to strictly control the number of the inclusions described above, and the present invention was completed.

Further more specifically, as will be shown in Examples described below, the total of inclusions described below obtained by abstraction from steel should be made 20 nos./500 g or below.

Inclusions with 70% or above of $SiO_2$ content (presuming $Al_2O_3$+MgO+CaO+$SiO_2$+MnO=100%, hereafter the same. Also, % means mass %, hereafter the same with respect to inclusions) and with 4 or above of L (large diameter of inclusion)/D (short diameter of inclusion) and 25 μm or above of D, and Inclusions with 70% or above of $SiO_2$ content (presuming $Al_2O_3$+MgO+CaO+$SiO_2$+MnO=100%, hereafter the same) and with less than 4 of L/D and 25 μm or above of L.

(Hereafter, these inclusions abstracted may be collectively referred to as "$SiO_2$-based inclusions".)

Figure 1:
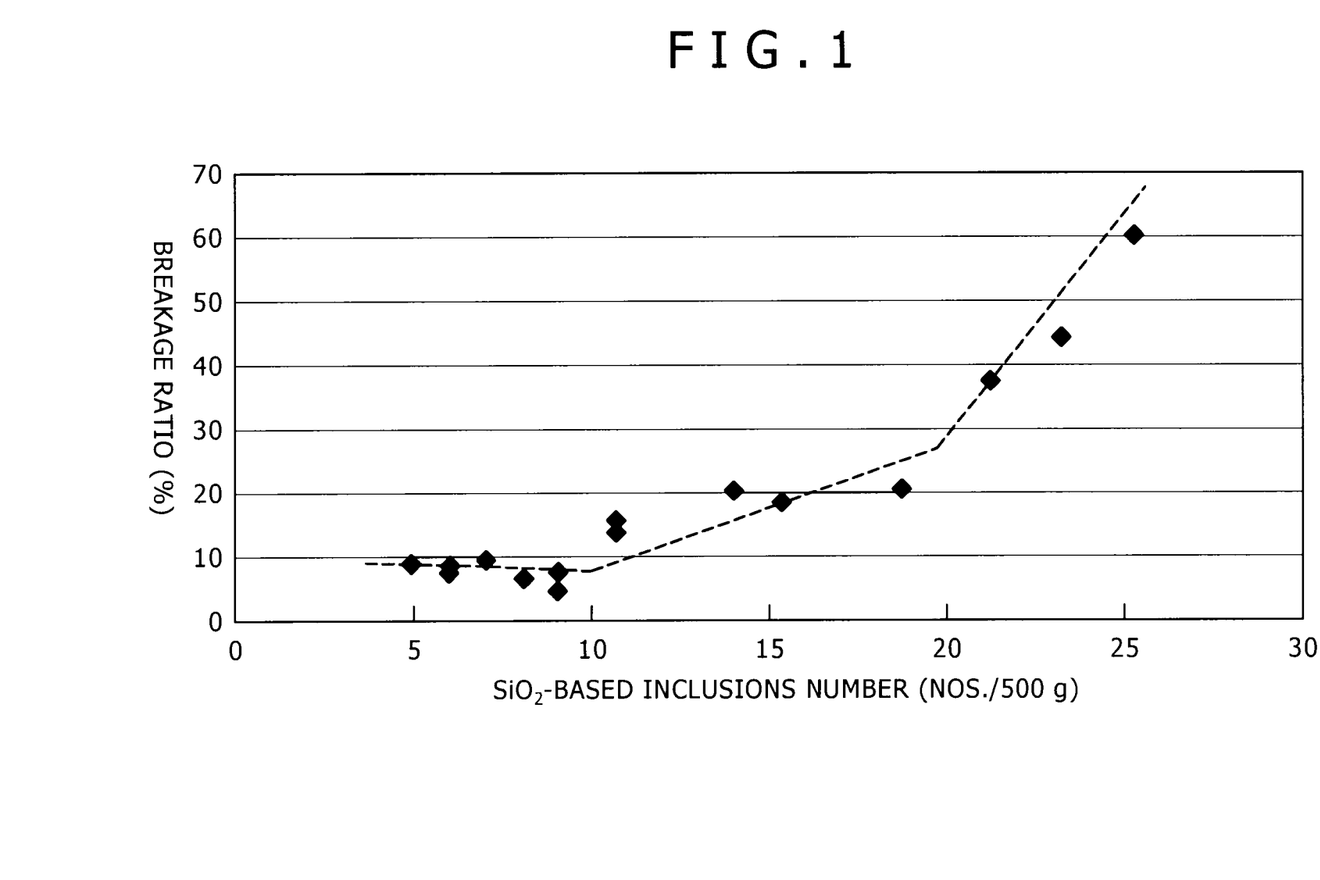
FIG. 1 A graph showing the investigation results on the effect of the number of $SiO_2$-based inclusions (nos./500 g steel) on fatigue properties (breakage ratio obtained by a method described in Example).

FIG. 1 is a graph showing the investigation results on the effect of the number of the $SiO_2$-based inclusions described above on fatigue properties (breakage ratio obtained by a method described in Example described below). As shown in FIG. 1, it is known that the breakage ratio becomes extremely small by controlling the $SiO_2$-based inclusions to 20 nos./500 g or below. Preferably, if the $SiO_2$-based inclusions are controlled to 12 nos./500 g or below, fatigue properties can be further improved.

In order to obtain the steel with $SiO_2$-based inclusions being controlled as described above, a method, for example, can be cited wherein, in vacuum induction melting, carbon deoxidation in vacuum as following is performed, and oxygen level is lowered sufficiently (3 ppm or below). That is, inside the furnace is evacuated (60 Torr or below) and C is finely dividedly added until the target C concentration is reached. Free oxygen is measured by a zirconia oxygen sensor, if it is not the target level or below (3 ppm or below), inside the furnace is evacuated (60 Torr or below) again (at this time, partial CO pressure inside the furnace lowers, therefore, C and O in molten steel react and concentration of C in molten steel also lowers), and C is finely dividedly added until the target C concentration is reached.

The spring steel in relation with the present embodiment is to satisfy the following fundamental components. Firstly, C is an element useful in securing high strength, and it is preferable to make C content 0.2% (means mass %, hereafter the same with respect to the component) or above in order that the effect is sufficiently exerted. More preferably it is 0.3%, or above, and further more preferably it is 0.4% or above. However, if C content becomes excessive, steel becomes brittle which is not practical, therefore it is controlled to 1.2% or below.

In the spring steel in relation with the present embodiment, the steel of Si: 1.2% or above is made an object. However, if Si is excessively contained, steel material becomes liable to be embrittled, therefore Si is controlled to 4% or below.

In order to control the composition of inclusions, Mn, which is deoxidation component, is made contain by 0.1% or above. However, if this component is excessively contained, steel material becomes liable to be embrittled, therefore Mn content is controlled to 2.0% or below.

Al is an element useful in control of inclusions and is required at approximately 0.0001% as the total Al. However, if the total Al content becomes much, $Al_2O_3$ concentration in inclusions becomes high and it is possible that coarse $Al_2O_3$ which becomes the cause of wire breakage is generated, therefore it is controlled to 0.01% or below.

The elements contained in the spring steel in relation with the present invention are as described above, and the balance is iron and inevitable impurities. For the inevitable impurities, mixing in of elements brought in by the situation of raw material, manufacturing materials, manufacturing equipment and the like is allowable. Also, it is effective to further improve properties by positively containing elements described below.

{One or More Kinds Selected from a Group Consist of Cr: 3% or Below (not Inclusive of 0%), Mo: 0.5% or Below (not Inclusive of 0%), W: 0.5% or Below (Not inclusive of 0%), and Co: 0.5% or Below (not Inclusive of 0%)}

These elements are the elements effective in improving softening resistance property, and in order to make the effect exert, it is preferable to contain by 0.5% or above for Cr, 0.05% or above for Mo, 0.05% or above for W, and 0.01% or above for Co. However, if these elements are excessive, quenching property becomes too high and breakage becomes liable to occur during working, therefore it is preferable to control to 3% or below for Cr, 0.5% or below for Mo, 0.5% or below for W, and 0.5% or below for Co.

{One or More Kinds Selected from a Group Consist of V: 0.5% or Below (not Inclusive of 0%), Nb: 0.1% or Below (not Inclusive of 0%), and Ti: 0.1%) or Below (not Inclusive of 0%)}

These elements are the elements effective in grain refinement, and in order to make the effect exert, it is preferable to contain by 0.01% or above for V, 0.01% or above for Nb, and 0.01% or above for Ti. However, if these elements are excessive, coarse nitride is generated and fatigue strength is lowered. Therefore, it is preferable to control to 0.5% or below for V, 0.1% or below for Nb, and 0.1% or below for Ti.

{Cu: 0.1% or Below (not Inclusive of 0%) and/or Ni: 0.5% Or Below (not Inclusive of 0%)}

These elements are the elements effective in inhibiting low temperature embrittlement, and in order to make the effect exert, it is preferable to contain by 0.05% or above for Ni, and 0.01% or above for Cu.

However, even if these elements are contained excessively, its effect saturates only, therefore it is preferable to make Ni at 0.5% or below, and Cu at 0.1% or below, from the economical viewpoint.

{REM: 0.1-50 ppm}

REM (rare earth metal; Ce, La and the like) has an action of further softening nonmetallic inclusions in steel. To make the effect exert, it is preferable to contain 0.1 ppm or above. However, even if the element is added excessively, the effect saturates only, therefore it is preferable to make it 50 ppm or below.

{Alkali Metal Elements and/or Alkaline Earth Metal Elements: 0.1-50 ppm in Total}

Alkali metal elements (Li, Na, K, Rb, Cs) and alkaline earth metal elements (Mg, Ca, Ba, Sr) have an action of further softening nonmetallic inclusions in steel. To make the effect exert, it is preferable to contain 0.1 ppm or above in total. However, even if the elements are added excessively, the effect saturates only, therefore it is preferable to make it 50 ppm or below in total.

As described above, the spring steel in relation with the first embodiment of the present invention is excellent in drawing workability because $SiO_2$-based inclusions are extremely controlled, and can secure excellent fatigue properties. Consequently, the spring steel in relation with this embodiment is useful in manufacturing springs used, for example, in the automobile field, the industrial machinery field and the like. In particular, it is best suited to manufacturing springs used for a restoring mechanism of machinery such as a valve spring and a clutch spring for an automobile engine, a brake spring, a suspension spring for a suspension and the like which require extremely high fatigue properties, and the like.

[The Second Embodiment]

Next, an embodiment in relation with the second spring steel of the present invention will be described.

In a wire rod with a large deformation ratio during hot rolling, it is known that refinement of inclusions by stretchingly tearing during hot rolling is useful. Conventionally, because hard inclusions were disliked, control to low melting point composition (the Patent Document 3) and control to a certain composition region (the Patent Document 4) were performed. However, because the main aim was the control to low melting point composition, the composition was such that $SiO_2$ would be generated theoretically, and $SiO_2$ was generated rarely.

Under such circumstance, the present inventors studied from a variety of angles on composition and a form of respective inclusion for improving fatigue resistance property of springs considering also the change in the form of inclusions by heating after solidification and by hot rolling. As a result, it was known that, by controlling to the composition wherein $SiO_2$ would not be generated theoretically, generation of $SiO_2$ could be inhibited remarkably regardless of rolling condition. In other words, as will be known from FIG. 4 exhibited below, even within the range of the low melting point, the melting point in the side where $SiO_2$ concentration is high is occasionally lower compared with that in the side where $SiO_2$ concentration is low. Consequently, controlling to the lower side of $SiO_2$ concentration was not common. Then, the present inventors found out that harmful $SiO_2$ could be remarkably controlled by performing control of the composition to a predetermined region and that tearing was possible during hot rolling even in the side where $SiO_2$ concentration was low, and the present invention was completed.

The working effects by the constitution of this embodiment will be described successively. In the spring steel in relation with this embodiment, it is necessary that the oxide-based inclusions with the width: 3 μm or above which are present in the surface layer side from the surface of a wire rod to the depth of ¼ of the diameter satisfy inequality (1) below, and the concentration of MgO is 5 mass % or below (inclusive of 0 mass %) and the concentration of MnO is 10 mass % or below (inclusive of 0 mass %).

$$CaO+Al_2O_3+SiO_2>80 (mass\ \%) \quad (1)$$

The reason the inclusions which are made the object here are specified as "the width: 3 μm or above" is that the fine inclusion with the width: less than 3 μm is hard to become the start point of the fatigue failure and has not a conspicuous influence on fatigue strength. Also, the reason the position of the presence of such inclusion is specified as "the surface layer side from the surface of a wire rod to the depth of ¼ of the diameter" is that the inclusion present in this position influences fatigue properties most.

In a wire rod, irregular inclusions (oxide of Ti, Cr, and the like, for example) mixed in inevitably, other than CaO, $Al_2O_3$, $SiO_2$, MnO and MgO, are present. If their quantity is small, they do not become a problem, but if their quantity increases, they may possibly become the start point of the fatigue failure. From such a viewpoint, when the composition of inclusions is observed by five elements (CaO, $Al_2O_3$, $SiO_2$, MnO and MgO), it is necessary to make [CaO+$Al_2O_3$+$SiO_2$] the main constituent (80 mass % or above) and to appropriately control MgO quantity and MnO quantity as well.

Also, if MgO quantity in inclusions becomes excessive, a hard oxide of MgO—$SiO_2$, spinel and the like becomes generated, therefore MgO content in inclusions needs to be made 5 mass % or below.

Further, when composition of inclusions is stably controlled, an oxide of Mn (MnO), which is a weak deoxidation component, becomes 10 mass % or below. From such a viewpoint, if MnO content in inclusions exceeds 10 mass %, it shows that inclusions are in a non-preferable state, therefore MnO content in inclusions needs to be made 10 mass % or below.

In the spring steel in relation with this embodiment, under the condition described above, $Al_2O_3$ quantity when normalized so that three components of CaO, $Al_2O_3$ and $SiO_2$ in inclusions become 100% and the relation of $Al_2O_3$ and $SiO_2$ and the like need to be strictly stipulated to satisfy the predetermined region. In other words, when CaO, $Al_2O_3$ and $SiO_2$ in oxide-based inclusions are expressed respectively as per the equations (2)-(4) below, they need to be controlled to satisfy the relation of the equations (5) and (6) below.

$$[Cn](mass\ \%)=[(CaO)/(CaO+Al_2O_3+SiO_2)]\times 100 \quad (2)$$

$$[An](mass\ \%)=[(Al_2O_3)/(CaO+Al_2O_3+SiO_2)]\times 100 \quad (3)$$

$$[Sn](mass\ \%)=[(SiO_2)/(CaO+Al_2O_3+SiO_2)]\times 100 \quad (4)$$

$$[An]+4.29[Sn]\leq 221.9 (mass\ \%) \quad (5)$$

$$[An]\leq 30 (mass\ \%) \quad (6)$$

In the spring steel in relation with this embodiment, it is necessary that $SiO_2$ is not generated even if phase separation occurs in heating before hot rolling and during hot rolling. For example, in the three component system phase diagram shown in FIG. 3, if the composition of inclusions is within the composition area indicated by oblique lines, phase separation occurs theoretically and $SiO_2$ is generated, therefore such area needs to be excluded. In the $SiO_2$ generation region indicated in FIG. 3, Line A becomes the line connecting CaO—$SiO_2$ (Wallastonite) and CaO—$Al_2O_3$-$2SiO_2$ (Anorthite). In other words, in order that $SiO_2$ is not generated even if phase separation occurs in heating before hot rolling and during hot rolling, the region needs to be in the lower side of low $SiO_2$ from Line A in FIG. 3 (lower side of Line A in FIG. 3).

Figure 3:
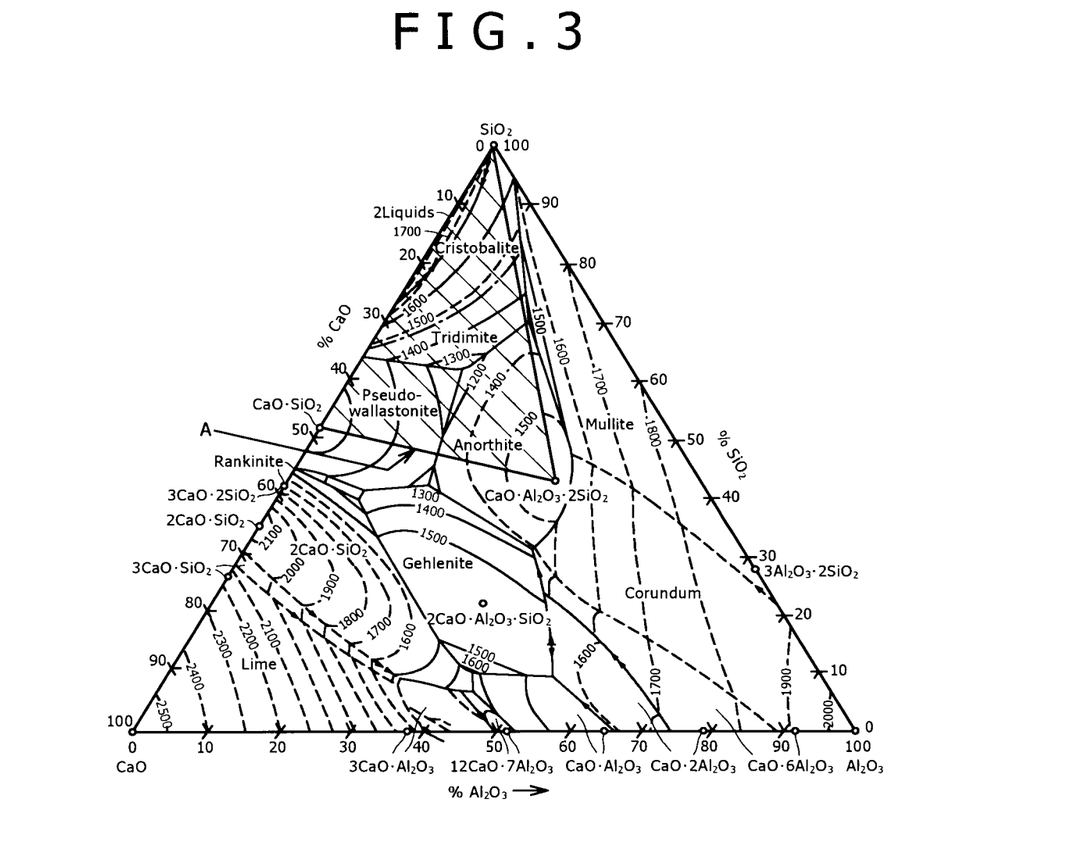
FIG. 3 A CaO—$Al_2O_3$—$SiO_2$ three component system phase diagram showing a region where $SiO_2$ is generated by phase separation in heating before hot rolling and during hot rolling.

The present inventors found out that control to lower $SiO_2$ side of Line A was effective. The equation (5) described above represents Line A. That means $SiO_2$ is not generated even if phase separation occurs in heating before hot rolling and during hot rolling, if the relation of the equation (5) described above is satisfied.

Also, in the composition of inclusions, if $Al_2O_3$ quantity when normalized by three components of CaO, $Al_2O_3$ and $SiO_2$ (which is [An] described above) exceeds 30 mass %, hard crystal such as Ghelenite and Anorthite is generated and has a harmful influence on fatigue strength, therefore it is necessary to satisfy the relation of the equation (6).

On the other hand, in the spring steel of the present invention, when CaO concentration [Cn], $Al_2O_3$ concentration [An] and $SiO_2$ concentration [Sn] of the composition of an inclusion are expressed by a $Al_2O_3$—$SiO_2$—CaO three component system phase diagram, its melting point needs to be 1,500 DEG C. or below. In other words, the reduction ratio of valve spring steel during hot rolling is large and it is expectable to make inclusions refined and non-harmful during hot rolling. Therefore, the control to the composition wherein inclusions are easily deformed during hot rolling even if its quantity is large is directed. In this embodiment, inclusions need to be controlled to low melting point composition where deformation is easy, and its melting point was made 1,500 DEG C. or below. It is preferably 1,400 DEG C. or below.

Figure 4:
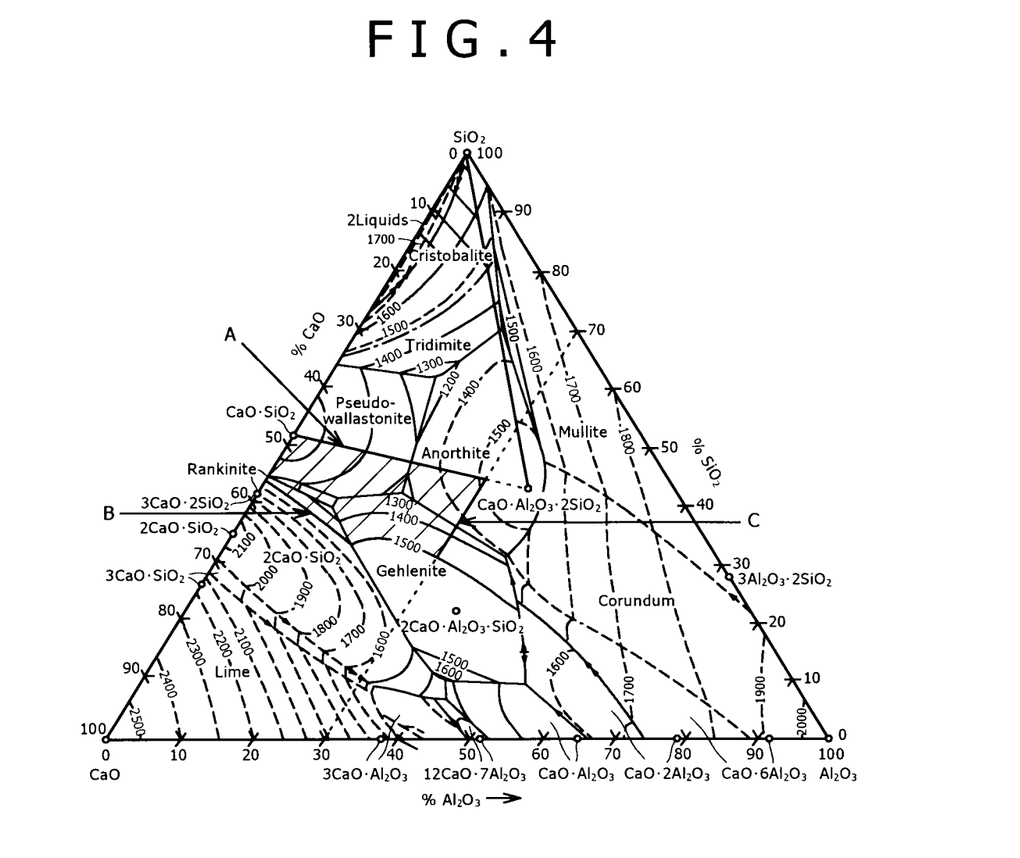
FIG. 4 A CaO—$Al_2O_3$—$SiO_2$ three component system phase diagram showing the composition of inclusions stipulated by the present invention.

Area of the composition of inclusions stipulated in this embodiment is shown in FIG. 4 ($Al_2O_3$—$SiO_2$—CaO three component system phase diagram). In FIG. 4, Line A is the one satisfying the relation of $\{([An]+4.29 [Sn]=221.9$ (mass %)$\}$, Line C is the one satisfying the relation of $\{([An]=30$ (mass %)$\}$, and Line B is the one wherein the melting point of an inclusion satisfies 1,500 DEG C. (isothermal line). Consequently, in FIG. 4, the area surrounded by Lines A, B, C (shown by hatching in the drawing) is the area stipulated by the present invention.

In realizing such composition of inclusions as described above, control of inclusions can be performed easily by using the slag with the same composition which is same with the target composition of inclusion.

The steel in relation with this embodiment is assumed of high cleanliness steel useful as a material for spring steel and the like, but its steel kind is not particularly limited. In order to control the composition of inclusions, it is preferable to contain Si by 1.2 Mass % or above, Mn by 0.1 mass % or above which are the deoxidation components. However, if these components are contained excessively, steel material becomes liable to be brittle, therefore Si should be 4 mass % or below and Si should be 2 mass % or below.

The content of C which is the fundamental component as spring steel is preferably 1.2 mass % or below. If C content exceeds 1.2 mass %, the steel material is embrittled and becomes non-practical.

Al is an element useful for control of inclusions also, and is necessary by approximately 0.1-20 ppm in mass concentration. However, if Al content increases, $Al_2O_3$ concentration in inclusions becomes high and coarse $Al_2O_3$ which becomes the cause of wire breakage is possibly generated, therefore it is preferably 0.01 mass % or below.

The balance other than the fundamental components described above is Fe and inevitable impurities, but if necessary, it may include one or more kinds selected from a group consist of Cr, Ni, V, Nb, Mo, W, Cu, Ti, Li, Na, K and rare earth metal (REM). Preferable contents when they are contained are, Cr: 0.5-3 mass %, Ni: 0.5 mass % or below, V: 0.5 mass % or below, Nb: 0.1 mass % or below, Mo: 0.5 mass % or below, W: 0.5 mass % or below, Cu: 0.1 mass % or below, Ti: 0.1 mass % or below, Li: 0.0005 mass % or below, Na: 0.0010 mass % or below, K: 0.0010 mass % or below, and REM: 0.0010 mass % or below.

As described above, the spring steel in relation with the second embodiment of the present invention is excellent in fatigue properties because the entire inclusions are of low melting point and easy to be deformed, and $SiO_2$ is hard to be generated even phase separation occurs in heating before hot rolling and during hot rolling. Consequently, the spring steel in relation with this embodiment is useful in manufacturing springs used, for example, in the automobile field, the industrial machinery field and the like. In particular, it is best suited to manufacturing springs used for a restoring mechanism of machinery such as a valve spring and a clutch spring for an automobile engine, a brake spring, a suspension spring for a suspension and the like which require extremely high fatigue properties, and the like.

Although the present invention will be described below in further detail by referring to the Examples, the Examples below by no means limit the present invention and any design change reflecting the purposes described above and below is to be included within the technical range of the present invention.

EXAMPLE 1

Approximately 150 kg of steel and the alloy components other than Si, Al, Mg were molten by a vacuum induction melting furnace, and, in order to evaluate the degree of hazard of various kinds of oxides, inclusions in steel were removed (total oxygen: 5 ppm or below) by induction stirring. Also, in the present example, in order to observe the influence of the kind of inclusions on fatigue properties, as shown in Table 1, alloy elements and $Fe_2O_3$ were added (further, Wallastonite slag was put on for Nos. 6, 10 only) after deoxidation described above, and molten steel was prepared so that a variety of inclusions would be present.

Then, molten steel was casted in a mold, an ingot obtained was subjected to forging and hot rolling, and the wire rod with the diameter: 8.0 mm of the componential composition shown in Table 1 was obtained.

Further, if refining is performed in a common method, various kinds of oxides are spontaneously generated and control of oxide in steel are very difficult, therefore manufacturing of steel wherein only the target oxide is present and inclusions of other composition is perfectly excluded becomes difficult. As a result, evaluation of the influence on fatigue strength distinguishing each kind of oxide is difficult as well. Consequently it was decided to investigate the influence on fatigue properties by preparing steel including inclusions of respective composition only by a vacuum induction furnace as described above.

TABLE 1

| Experiment No. | Chemical components (mass %) * | | | | | | | | Manufacturing condition |
| --- | --- | --- | --- | --- | --- | --- | --- | --- | --- |
| | C | Si | Mn | Al | Cr | Ni | V | Others | |
| 1 | 0.6 | 2.0 | 0.7 | 0.002 or below | 1.8 | 0.2 | 0.2 | — | C deoxidation in vacuum → Add alloy elements other than Si → Add Si + $Fe_2O_3$ |
| 2 | 0.7 | 1.5 | 0.7 | 0.002 or below | 0.6 | 0.2 | — | — | C deoxidation in vacuum → Add alloy elements other than Si → Add Mg, Si + $Fe_2O_3$ |

TABLE 1-continued

| Experiment No. | Chemical components (mass %) * | | | | | | | | Manufacturing condition |
|---|---|---|---|---|---|---|---|---|---|
| | C | Si | Mn | Al | Cr | Ni | V | Others | |
| 3 | 0.6 | 2.4 | 0.5 | 0.002 or below | — | — | — | — | C deoxidation in vacuum → Add alloy elements other than Si → Add Si + $Fe_2O_3$ |
| 4 | 0.6 | 3.2 | 0.5 | 0.002 or below | 0.5 | — | 0.2 | — | C deoxidation in vacuum → Add alloy elements other than Si → Add Si + $Fe_2O_3$ |
| 5 | 0.6 | 2.0 | 0.2 | 0.002 or below | — | — | — | — | C deoxidation in vacuum → Add alloy elements other than Si → Add Mg, Si + $Fe_2O_3$ |
| 6 | 0.7 | 1.5 | 1.1 | 0.002 or below | 2 | 0.2 | 0.8 | — | C deoxidation in vacuum → Add alloy elements other than Si → Add Wallastonite slag → Add Si + $Fe_2O_3$ |
| 7 | 0.9 | 0.5 | 0.8 | 0.002 or below | — | — | — | — | C deoxidation in vacuum → Add alloy elements other than Si → Add Si + $Fe_2O_3$ |
| 8 | 0.7 | 2.1 | 0.7 | 0.003 | 1.5 | — | 0.4 | — | C deoxidation in vacuum → Add alloy elements other than Si → Add Al, Si + $Fe_2O_3$ |
| 9 | 0.6 | 3.2 | 0.5 | 0.002 or below | 0.5 | — | 0.2 | Ti: 0.002 | C deoxidation in vacuum → Add alloy elements other than Si → Add Si + $Fe_2O_3$ |
| 10 | 0.7 | 1.5 | 1.1 | 0.002 or below | 2 | 0.2 | 0.8 | Mo: 0.007 | C deoxidation in vacuum → Add alloy elements other than Si → Add Wallastonite slag → Add Si + $Fe_2O_3$ |
| 11 | 0.6 | 2.0 | 0.7 | 0.002 or below | — | — | 0.2 | Li: 0.0001 | C deoxidation in vacuum → Add alloy elements other than Si → Add Si + $Fe_2O_3$ |
| 12 | 0.6 | 2.0 | 0.7 | 0.002 or below | 1.8 | 0.2 | — | Ce: 0.0005 | C deoxidation in vacuum → Add alloy elements other than Si → Add Si + $Fe_2O_3$ |
| 13 | 0.6 | 1.5 | 0.7 | 0.002 or below | 1 | 0.2 | — | — | C deoxidation in vacuum → Add alloy elements other than Si → Add Si + $Fe_2O_3$ |
| 14 | 0.6 | 2.1 | 0.6 | 0.002 or below | — | 0.2 | — | — | C deoxidation in vacuum → Add alloy elements other than Si → Add Si + $Fe_2O_3$ |
| 15 | 0.6 | 2.5 | 0.5 | 0.002 or below | — | — | 0.2 | — | C deoxidation in vacuum → Add alloy elements other than Si → Add Si + $Fe_2O_3$ |

* Balance: iron and inevitable impurities

With respect to each wire rod obtained, measuring of the number of $SiO_2$-based inclusions and identification of the kind of coarse inclusions in the microscopic examination plane were performed, and fatigue properties were evaluated. The method of these measurement and evaluation is as described below.

{Measurement of the Number of $SiO_2$-Based Inclusions}

Figure 2:
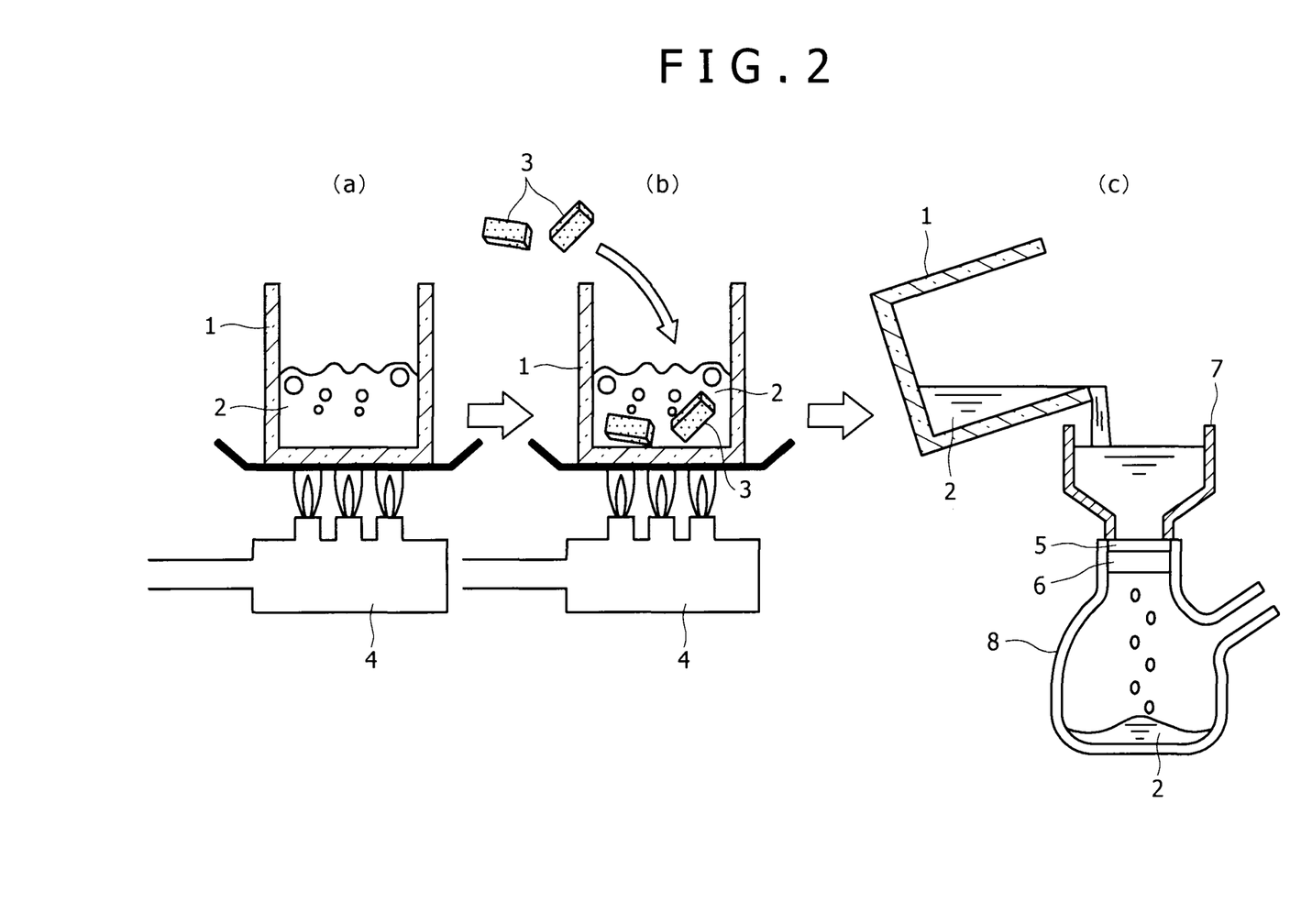
FIG. 2 An explanatory drawing showing an abstraction procedure of $SiO_2$-based inclusions in Example.

After the scales on the surface of the wire rod (the diameter: 8.0 mm) were removed, 20 nos. of samples (25 g) were cut out. The samples cut out were molten by the procedure shown in FIG. 2, and inclusions were abstracted. As exhibited in FIG. 2, aqueous solution of nitric acid 2 was put in a beaker 1 first, this aqueous solution of nitric acid was heated (50 DEG C. or above) by a heater 4 [FIG. 2 (a)], and a sample 3 was put in the heated aqueous solution of nitric acid. The sample 3 was dissolved by the aqueous solution of nitric acid 2, and the oxide-based inclusions present in the sample 3 were eluted [FIG. 2 (b)]. The aqueous solution of nitric acid 2 after finishing dissolution and elution is filtered (a membrane filter 5, a filter stand 6 and a funnel 7) after cooling, the aqueous solution of nitric acid 2 is stored in a flask 8, and the oxide-based inclusions were eluted as the residue on the membrane filter 5 [FIG. 2 (c)]. Further, the dissolution described above was performed in the manner wherein the nitric acid ($HNO_3$): 250 mL (milliliter) added with water to make 700 mL and added further with 10 mL of sulfuric acid was prepared in a beaker of a 2 L capacity, and a steel sample of 25 g was put in it and was dissolved. Here, the material of the beaker, funnel and filter stand used is polytetrafluoroethylene [PTFE: Teflon (registered trademark)]. Also, with respect to the membrane filter used in filtering, one with the pore size of 1 μm was used.

Also, whenever the inclusions described above were abstracted, the blank test was performed and the abstract in the blank was confirmed to be zero. In the blank test, in performing abstraction and evaluation of inclusions using the sample, with the beaker without the sample put in, exactly same procedures as the above are followed, with the only exception that the sample was not put in, to confirm that the abstract from those other than the sample is zero.

Determination of inclusions was performed under the conditions described below. Further, in the quantitative analysis, the presence concentration of Al, Mn, Si, Mg, Ca, Ti, Zr, K, Na, S, O objecting the inclusions of 4 or above of L (the large diameter of an inclusion)/D (the short diameter of an inclusion; the short diameter means the width of the widest line which is perpendicular to the long diameter) and 25 μm or above of D and inclusions of less than 4 of L/D and 25 μm or above of L, was obtained. Then, for the oxide-based inclusions with 25% or above of oxygen concentration, assuming that respective element described above was present in the form of $Al_2O_3$, MnO, $SiO_2$, MgO, CaO, $TiO_2$, $ZrO_2$, $K_2O$, $Na_2O$, S, the presence concentration of the oxides and S in the inclusions was calculated on the basis of the concentration of respective element obtained by determination described above. Then, the number of those with 70% or above of $SiO_2$ ratio, presuming $Al_2O_3$+MgO+CaO+$SiO_2$+MnO=100% (mass %), was obtained, thereafter the average value of 20 nos. of samples was obtained to convert to the value (number) per 500 g of steel.

[Analytical Instrument]
  EPMA device: JXA-8621MX made by JEOL
  Analytical instrument (EDS): TN-5500 made by Tracor Northern
[Analytical Conditions]
  Energy dispersion analysis
  Voltage (acceleration voltage): 20 kV
  Test current (acceleration current): 50 nA (nanoampere)
  Magnification: 150 times
  Analytical position of an inclusion: SPOT (one point measuring for the position of the maximum magnitude)
[Photographing Conditions]
  Voltage (acceleration voltage): 20 kV
  Test current (acceleration current): 50 nA (nanoampere)
  Photographing magnification: According to the size of an inclusion {Measurement of the Composition of Coarse Inclusions in The Microscopic Examination Plane}

L section including a diameter of respective wire rod described above was ground, 1,000 mm² of the surface layer side of D/4 part (D: diameter) of the wire rod was observed, the inclusions with 25 μm or above width which was perpendicular to the rolling direction were analyzed under the conditions described below, and the kind and number of the inclusions were obtained. Further, MgO—SiO$_2$ shown in Table 2 are those with the composition near to MgO—SiO$_2$ or 2MgO—SiO$_2$ and are of 40-65% SiO$_2$ content, therefore they are distinguished from the inclusions with stipulated 70% or above of SiO$_2$ content.

EPMA device: JXA-8621MX made by JEOL
Analytical instrument (EDS): TN-5500 made by Tracor Northern
Voltage (acceleration voltage): 20 kV
Scanning current: 5 nA (nanoampere)
Measuring method: Quantitative analysis by energy dispersion analysis

[Public Scan (Measurement Over the Entire Particle)]

{Evaluation of Fatigue Properties}

For respective wire rod (8.0 mm φ), after performing scalping→patenting→cold wire drawing working (wire drawing)→oil tempering→process equivalent to strain relieving annealing→shot peening→strain relieving annealing, 4.0 mm φ×650 mm wires were acquired as test pieces, a rotating bending test was performed using a Nakamura method rotating bending tester under the condition of the testing stress: 908 MPa nominal stress, speed: 4,000-5,000 rpm, number of times of stoppage: 2×10$^7$ times, the number of the test pieces broken due to inclusions (although there were cases wherein the test piece was broken from the surface and the like of the wire not arising from inclusions, such cases were not made the objects) among the test pieces ruptured on the way was measured, and the breakage ratio was measured according to the equation below.

Breakage ratio=[number of those broken by inclusion/(number of those broken by inclusion+number of those attained the stoppage number of times)]×100(%)

The number of SiO$_2$-based inclusions, the kind and number of coarse inclusions in the microscopic examination face, and fatigue properties (breakage ratio) described above are shown in Table 2.

Based on these results, following consideration is possible (also, the No. described below shows the experiment No. in the table). It is known that the steel of Nos. 1-12 wherein SiO$_2$-based inclusions are inhibited as stipulated in the present invention is excellent in fatigue properties. On the contrary, the steel of Nos. 13-15 wherein SiO$_2$-based inclusions exceeds the stipulated region of the present invention is inferior in fatigue properties.

Also, the following is known from Table 2. In observation of the microscopic examination plane, the observed area is small, and the inclusions such as SiO$_2$-based inclusions which are present in small numbers only are not detected, whereas such inclusions can be also detected according to the abstraction method. Further, although SiO$_2$-based inclusions are not detected in the microscopic examination plane, other crystal-based inclusions are detected, therefore it is known that other crystal-based inclusions are present more than the SiO$_2$-based inclusions.

Further, it is known that the breakage ratio correlates not with the number of crystal-based inclusions other than SiO$_2$-based inclusions but with the number of SiO$_2$-based inclusions and SiO$_2$-based inclusions are harmful, and that, consequently, in order to inhibit breakage, it is necessary to control SiO$_2$-based inclusions as stipulated in the present invention regardless of presence or absence of crystal-based inclusions other than SiO$_2$-based inclusions.

EXAMPLE 2

Molten steel which had imitated steel tapped from a converter added with a various kinds of flux was subjected to adjustment of compositions and refining with slag, and was casted. At this time, the composition of inclusions was appropriately controlled by appropriately adjusting the slag composition, and steel with the chemical component shown in Table 3 below was obtained. The condition of refining with slag for respective steel is shown in Table 4 below.

TABLE 3

| Test No. | Steel kind | Chemical componential composition (mass %) | | | | | |
|---|---|---|---|---|---|---|---|
| | | C | Si | Mn | Cr | Ni | V | Others |
| 21 | A | 0.6 | 2.2 | 0.5 | — | 0.2 | 0.1 | — |
| 22 | B | 0.6 | 2.0 | 0.9 | 1.7 | — | — | — |
| 23 | C | 0.6 | 1.4 | 0.7 | — | — | — | — |

TABLE 2

| Experiment No. | SiO$_2$-based inclusions (Nos./500 g) | Number of coarse inclusions in microscopic examination plane | | | | Breakage ratio in fatigue test (%) |
|---|---|---|---|---|---|---|
| | | SiO$_2$ | MgO—SiO$_2$ | Wallastonite | Anorthite | |
| 1 | 5 | 0 | 0 | 0 | 0 | 8 |
| 2 | 7 | 0 | 4 | 0 | 0 | 9 |
| 3 | 6 | 0 | 0 | 0 | 0 | 7 |
| 4 | 9 | 0 | 0 | 0 | 0 | 7 |
| 5 | 19 | 0 | 3 | 0 | 0 | 20 |
| 6 | 11 | 0 | 0 | 2 | 0 | 13 |
| 7 | 14 | 0 | 0 | 0 | 0 | 20 |
| 8 | 15 | 0 | 0 | 0 | 9 | 18 |
| 9 | 9 | 0 | 0 | 0 | 0 | 4 |
| 10 | 11 | 0 | 0 | 3 | 0 | 15 |
| 11 | 6 | 0 | 0 | 0 | 0 | 8 |
| 12 | 8 | 0 | 0 | 0 | 0 | 6 |
| 13 | 21 | 0 | 0 | 0 | 0 | 37 |
| 14 | 25 | 0 | 0 | 0 | 0 | 60 |
| 15 | 23 | 0 | 0 | 0 | 0 | 44 |

TABLE 3-continued

| Test No. | Steel kind | Chemical componential composition (mass %) | | | | | | |
|---|---|---|---|---|---|---|---|---|
| | | C | Si | Mn | Cr | Ni | V | Others |
| 24 | D | 0.4 | 2.8 | 0.4 | — | 1.7 | 0.3 | — |
| 25 | E | 0.6 | 2.2 | 0.5 | — | 0.2 | 0.1 | Li: 0.0001 |
| 26 | F | 0.6 | 2.0 | 0.9 | 1.7 | — | — | Ce: 0.001 |
| 27 | G | 0.6 | 1.5 | 0.7 | — | 0.4 | — | — |
| 28 | H | 0.6 | 2.0 | 0.9 | 0.9 | — | 0.1 | — |
| 29 | I | 0.5 | 1.4 | 0.7 | 0.7 | — | — | — |
| 30 | J | 0.6 | 2.1 | 0.7 | — | 1.7 | 0.2 | — |

TABLE 4

| Test No. | Steel kind | Chemical componential composition (mass %) | | |
|---|---|---|---|---|
| | | $Al_2O_3$ | $SiO_2$ | CaO |
| 21 | A | 15 | 42 | 16 |
| 22 | B | 15 | 43 | 35 |
| 23 | C | 24 | 37 | 29 |
| 24 | D | 4 | 46 | 47 |
| 25 | E | 15 | 42 | 16 |
| 26 | F | 15 | 43 | 35 |
| 27 | G | 30 | 38 | 27 |
| 28 | H | 18 | 54 | 22 |
| 29 | I | 15 | 59 | 20 |
| 30 | J | 23 | 28 | 47 |

The molten steel was casted in a mold, the ingot obtained was subjected to forging and hot rolling, and was made to a wire rod of the diameter: 8.0 mm.

For respective hot rolled wire rod obtained, the composition of oxide-based inclusions in the wire rod was measured and fatigue strength was measured. The measuring method of them is as follows.

{Measurement of the Composition of Inclusions}

L section (a section including an axis) of respective hot rolled wire rod was ground, and with respect to 30 nos. of oxide-based inclusions of 3 μm or above width (the diameter of an inclusion in the direction perpendicular to the axial direction) present in the surface layer side from the surface of the wire rod to the depth of ¼ of the diameter (the surface layer side of the position of ½ of the radius from the center of the wire rod), analysis of the composition is performed by EPMA, and was converted to oxide concentration. The measurement condition of EPMA then is as follows.

EPMA device: JXA-8621MX (made by JEOL Ltd.)
Analytical instrument (EDS): TN-5500 (made by Tracor Northern Instruments)
Acceleration voltage: 20 kV
Scanning current: 5 nA
Measuring method: Quantitative analysis by energy dispersion analysis (measurement over the entire particle)

{Evaluation of Fatigue Properties}

For respective hot rolled wire rod (8.0 mm φ), after performing scalping→patenting→cold wire drawing working (wire drawing)→oil tempering→process equivalent to strain relieving annealing→shot peening→strain relieving annealing, 4.0 mmφ×650 mm wires were acquired as test pieces, a test was performed using a Nakamura method rotating bending tester with the testing stress: 880 MPa nominal stress, speed: 4,000-5,000 rpm, the number of times of stoppage: $2×10^7$ times, and the rupture ratio was measured according to the equation below for those ruptured due to inclusions among those which were broken.

Rupture ratio=[number of those broken by inclusion/ (number of those broken by inclusion+number of those stopped]×100(%)

The composition of inclusions of respective steel is shown in Table 5 below. Also fatigue strength (rupture ratio) is shown in Table 6 below.

TABLE 5

| Test No. | Steel kind | Composition of inclusions: 5 elements (mass %) | | | | | |
|---|---|---|---|---|---|---|---|
| | | MgO | $Al_2O_3$ | $SiO_2$ | CaO | MnO | Total |
| 21 | A | 2.3 | 16.4 | 42.2 | 37.4 | 1.7 | 100.0 |
| 22 | B | 2.0 | 17.6 | 43.3 | 34.7 | 2.4 | 100.0 |
| 23 | C | 2.2 | 23.5 | 38.1 | 29.3 | 1.8 | 94.9 |
| 24 | D | 1.7 | 5.1 | 45.0 | 46.7 | 1.1 | 99.6 |
| 25 | E | 2.5 | 15.0 | 42.3 | 36.0 | 1.5 | 97.3 |
| 26 | F | 1.5 | 16.5 | 40.1 | 31.0 | 2.1 | 91.2 |
| 27 | G | 2.3 | 31.1 | 37.9 | 27.7 | 0.9 | 99.9 |
| 28 | H | 2.1 | 19.1 | 54.2 | 22.7 | 1.8 | 99.9 |
| 29 | I | 2.5 | 15.0 | 59.0 | 20.0 | 3.0 | 99.5 |
| 30 | J | 1.2 | 23.0 | 28.0 | 47.0 | 0.8 | 100.0 |

TABLE 6

| Test No. | Steel kind | Result of the fatigue test Rupture ratio (%) |
|---|---|---|
| 21 | A | 11 |
| 22 | B | 14 |
| 23 | C | 118 |
| 24 | D | 21 |
| 25 | E | 9 |
| 26 | F | 15 |
| 27 | G | 38 |
| 28 | H | 42 |
| 29 | I | 41 |
| 30 | J | 35 |

From these results, the following consideration is possible. It is known that, in those of the test Nos. 21-26, the composition of slag is appropriate, the composition of inclusions is controlled to an appropriate region, and excellent fatigue strength is obtained. Among them, in those of the test Nos. 21, 22 in particular, the composition of inclusions is within an optimal region, and excellent fatigue strength is obtained.

On the other hand, in those of the test Nos. 27-30, because the composition of inclusions are deviated from one stipulated in the present invention, the result of the fatigue test is not good.

The invention claimed is:

1. A high cleanliness spring steel which is a steel containing
C: 1.2% (means mass, hereafter the same with respect to each component) or below (not inclusive of 0%):
Si: 3.2-4%,
Mn: 0.1-2.0%,
Al: 0.1-20 ppm,
and the balance comprising iron with inevitable impurities;
wherein the total number of (1) oxide-based inclusions having 4 or above for L (the large diameter of an inclusion)/D (the short diameter of an inclusion) and D of 25 μm or above and (2) oxide-based inclusions having less than 4 L/D and L of 25 μm or above, in the oxide-based inclusions having an oxygen concentration of 25 mass % or above and a $SiO_2$ content of 70 mass % or above when $Al_2O_3$+MgO+CaO+$SiO_2$+MnO=100% is presumed, out of inclusions in the steel, is 20 nos./500 g or below.

2. The high cleanliness spring steel as set forth in claim 1 further containing, as other elements, one or more kinds selected from a group consisting of
Cr: 3% or below (not inclusive of 0%),
Mo: 0.5% or below (not inclusive of 0%),
W: 0.5% or below (not inclusive of 0%), and
Co: 0.5% or below (not inclusive of 0%).

3. The high cleanliness spring steel as set forth in claim 1 further containing, as other elements, one or more kinds selected from a group consisting of
V: 0.5% or below (not inclusive of 0%),
Nb: 0.1% or below (not inclusive of 0%), and
Ti: 0.1% or below (not inclusive of 0%).

4. The high cleanliness spring steel as set forth in claim 1 further containing, as other elements,
Cu: 0.1% or below (not inclusive of 0%) and/or Ni: 0.5% or below (not inclusive of 0%).

5. The high cleanliness spring steel as set forth in claim 1 further containing, as another element, REM by 0.1-50 ppm.

6. The high cleanliness spring steel as set forth in claim 1 further containing, as other elements, alkali metal elements and/or alkaline earth metal elements by 0.1-50 ppm in total.

7. A high cleanliness spring excellent in fatigue properties comprising the high cleanliness spring steel as set forth in claim 1.

8. A high cleanliness spring steel as set forth in claim 1, wherein the total number of (1) oxide-based inclusions having 4 or above for L (the large diameter of an inclusion)/D (the short diameter of an inclusion) and D of 25 μm or above and (2) oxide-based inclusions having less than 4 L/D and L of 25 μm or above, in the oxide-based inclusions having an oxygen concentration of 25 mass % or above and a $SiO_2$ content of 70 mass % or above when $Al_2O_3$+MgO+CaO+$SiO_2$+MnO=100% is presumed, out of inclusions in the steel, is 12 nos./500 g or below.

9. A high cleanliness spring excellent in fatigue properties comprising the high cleanliness spring steel as set forth in claim 8.

10. A high cleanliness spring steel which is a steel containing:
C: 1.2% (means mass, hereafter the same with respect to each component) or below (not inclusive of 0%):
Si: 3.2-4%,
Mn: 0.1-2.0%,
Al: 0.0001-0.01%,
total content of alkaline earth metal elements: 0.1-50 ppm, and the balance comprising iron with inevitable impurities;
wherein the total number of (1) oxide-based inclusions having 4 or above for L (the large diameter of an inclusion)/D (the short diameter of an inclusion) and D of 25 μm or above and (2) oxide-based inclusions having less than 4 L/D and L of 25 μm or above, in the oxide-based inclusions having an oxygen concentration of 25 mass % or above and a $SiO_2$ content of 70 mass % or above when $Al_2O_3$+MgO+CaO+$SiO_2$+MnO=100% is presumed, out of inclusions in the steel, is 20 nos./500 g or below.

* * * * *